Nov. 3, 1942.  G. W. ROSENBERGER  2,300,525
REGISTER SUPPORT
Filed Jan. 5, 1940

WITNESSES:
Edward Michaels
David Kreider

INVENTOR
George W. Rosenberger
BY
ATTORNEY

Patented Nov. 3, 1942

2,300,525

UNITED STATES PATENT OFFICE 2,300,525

REGISTER SUPPORT

George W. Rosenberger, Bloomfield, N. J., assignor to Westinghouse Electric & Manufacturing Company, East Pittsburgh, Pa., a corporation of Pennsylvania Application January 5, 1940, Serial No. 312,544

3 Claims. (Cl. 171—34)

My invention relates to a supporting device, and has particular relation to a device for furnishing auxiliary support for a register of the type which is detachably secured to an electrical instrument, such as a watthour meter.

In modern metering equipment it is common to provide the registering device with bayonet type mounting pins and design the meter itself with recessed lugs arranged to receive these pins. This bayonet type of register mounting has been widely used since it offers many advantages, among which is ease in removing registers for exchange or repair. The bayonet joint being the sole means employed to secure the register to the meter, it has been found that in the case of large registers such as those of the maximum demand and contact-making types, this mounting arrangement is not sufficiently rigid to insure the maximum accuracy and life of the register.

According to the invention, I provide a supporting device which may, for example, be screwed in one of the tapped holes usually provided for attaching the manufacturer's nameplate to a meter. An eccentrically arranged groove is disposed elsewhere on the device to engage a portion of the register and furnish support against relative motion between the register and meter.

It is, accordingly, an object of my invention to provide a novel and improved supporting member.

It is another object of my invention to provide a supporting member particularly adapted to aid in supporting a register upon an electric watthour meter.

A further object of my invention is to provide an improved method and means for supporting an indicating register upon an electric watthour meter.

Other objects of my invention will appear from the following detailed description taken in conjunction with the drawing, in which.

Figure 1:
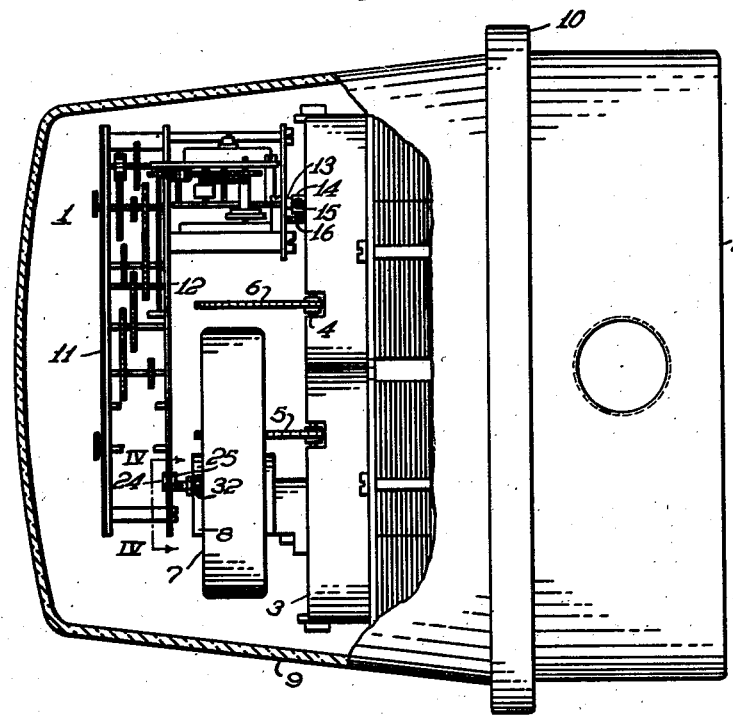
Figure 1 is a side elevation, with parts broken away, of an indicating register and electric meter assembly employing my invention.

Figure 1 shows an indicating register, designated generally by 1, assembled upon an electric watthour meter which is disposed on a meter base 2. In addition to the usual coils and windings, which are not shown, the meter includes a frame portion 3, a spindle 4 carrying discs 5 and 6 and a damping magnet 7 secured to the frame 3 by a clamp 8. The register and meter assembly is enclosed in a transparent cover 9, which is attached to the meter base 2 by means of a flange or clamp 10.

The register is a maximum demand register of the type disclosed in the United States copending application of Robert H. Lewis et al., Serial No. 217,024, filed July 1, 1938, and assigned to the Westinghouse Electric & Manufacturing Company. Briefly described, this register includes a framework comprising a front or dial plate 11 and a back plate 12, between which is disposed a part of the gear train. Located on the rear of the register framework are a pair of pins 13 arranged to be inserted into cooperating recessed lugs 14 secured on the meter framework 3. Set-screws 15 are provided to retain the register in position with its first gear 16 engaging a pinion on the meter spindle 4. This bayonet type register and assembly means is well known in the art, and is more fully described in United States Patent No. 1,598,489, issued August 31, 1926, to H. E. Miller et al., and assigned to the Westinghouse Electric & Manufacturing Company.

Figure 2:
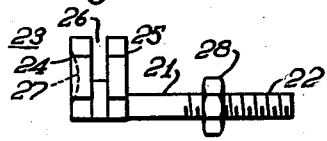
Fig. 2 is a side elevation of a supporting member constructed in accordance with my invention.
Figure 3:
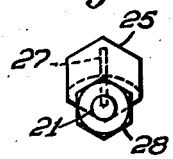
Fig. 3 is an end elevation of the supporting member of Fig. 1.

According to my invention, I employ the supporting member shown in Figs. 2 and 3 to obtain a more rigid assembly between the register 1 and the meter. This supporting member comprises a bolt portion 21 screw-threaded at one end as at 22 and an eccentric portion 23 on the other end. The eccentric portion, which is preferably integral with the bolt portion, includes a pair of head members 24 and 25 disposed perpendicularly to the bolt portion and arranged to form an eccentric groove 26. In the outer head portion 24 is formed a slot 27 for engagement of a screwdriver. Although both head members are shown in hexagonal form which will facilitate manipulation by a wrench, it is evident that either one or both of these members may be round or of any other desired shape. Located along the screw-threaded portion 22 is a nut 28 for locking the supporting member in position against rotation.

Figure 4:
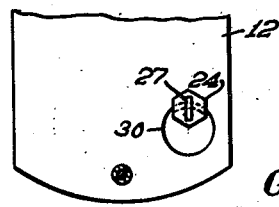
Fig. 4 is an enlarged sectional view of a portion of the assembly of Fig. 1 taken along the line IV—IV of Fig. 3.

The application of this supporting member to the register and meter assembly may be readily understood upon reference to Figs. 1 and 4. As is shown most clearly in Fig. 4, the lower portion of the register back plate 12 is provided with a hole 30. The screw-threaded portion 22 of the supporting member is screwed into a tapped hole in the damping magnet clamp 8, as at 32. The eccentric portion 23 of the supporting member is arranged to engage a portion of the back plate 12 as at the hole 30. The lock nut 28 is arranged to lock the supporting member in the desired position.

Numerous advantages of my auxiliary supporting means in the assembly above-described will now become evident. It furnishes additional rigidity between the lower part of the register and the meter without interfering with the detachability resulting from the bayonet type clamping arrangement. Since most meters are provided with a pair of holes for the nameplate screws, one or both of these holes may be used in conjunction with my supporting member without any additional drilling being necessary. Likewise many registers are provided with holes, such as that shown in Fig. 4 at 30. It will thus be found possible in many cases to apply my invention to present-day equipment without making changes therein. The design of future equipment may be easily modified to facilitate the use of this supporting member.

As various modifications thereof will appear to those skilled in the art, my invention is to be limited only by the appended claims, interpreted in view of the prior art.

I claim as my invention:

1. In an auxiliary support for a register which includes a plate member having an aperture therein and is adapted to be detachably connected by a main supporting means to an electric meter having a screw-threaded hole therein in alignment with said aperture, a member comprising a bolt portion screw-threaded at one end and screwed into said hole, an eccentric portion on the other end of said bolt portion defining a groove extending substantially perpendicular thereto for engaging said register plate member about the aperture therein while said bolt portion is in a predetermined rotary position, means on said eccentric portion to facilitate rotation of said bolt portion, and a nut on said bolt portion for locking it in said predetermined position to prevent accidental displacement of the eccentric groove from engagement with said plate member.

2. In combination, an electric meter, a register, cooperating means on said meter and register for detachably securing the register in operating position on said meter, said register including a plate member having an aperture therein at a location displaced from the said securing means, said meter having a screw-threaded hole therein adjacent the opening in said register plate member, and a support member comprising a bolt portion screw-threaded at one end and screwed into the hole in said meter, and an eccentric portion on the other end of said bolt portion defining a groove extending substantially perpendicular thereto for engaging said register plate member about the aperture therein when the bolt portion is in a predetermined position.

3. In combination, an electric meter, a register including a base plate, cooperating means on said meter and register for detachably securing the register in operating position on said meter, the base plate of said register having an aperture therein at a location displaced from said securing means, said meter having a screw-threaded hole therein in alignment with the opening in said register when it is in operating position on the meter, and an auxiliary support member comprising a bolt portion screw-threaded at one end and screwed into the hole in said meter, an eccentric portion on the other end of said bolt portion defining a groove extending substantially perpendicular thereto for engaging said base plate about the aperture therein while the bolt portion is in a predetermined rotary position, said eccentric portion being designed to completely disengage said plate member while said bolt portion is displaced from said predetermined rotary position, and means on said eccentric portion to facilitate rotation of said bolt portion.

GEORGE W. ROSENBERGER.